US010460108B1

United States Patent
Huang et al.

(10) Patent No.: US 10,460,108 B1
(45) Date of Patent: Oct. 29, 2019

(54) METHOD AND SYSTEM TO IDENTIFY AND RECTIFY INPUT DEPENDENCY BASED EVASION IN DYNAMIC ANALYSIS

(71) Applicant: Trend Micro Incorporated, Tokyo (JP)

(72) Inventors: Qiang Huang, Nanjing (CN); Ben Huang, Nanjing (CN); Kai Yu, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 156 days.

(21) Appl. No.: 15/678,993

(22) Filed: Aug. 16, 2017

(51) Int. Cl.
  *G06F 21/00* (2013.01)
  *G06F 21/56* (2013.01)
  *G06F 21/53* (2013.01)

(52) U.S. Cl.
  CPC .......... *G06F 21/566* (2013.01); *G06F 21/53* (2013.01); *G06F 2221/033* (2013.01)

(58) Field of Classification Search
  CPC ...... G06F 21/53; G06F 21/554; G06F 21/566; G06F 2221/033
  USPC ........................................................ 726/23
  See application file for complete search history.

(56) References Cited

U.S. PATENT DOCUMENTS

| | | | | |
|---|---|---|---|---|
| 5,671,419 A | * | 9/1997 | Carini .................... | G06F 8/433 717/145 |
| 7,523,500 B1 | | 4/2009 | Szor et al. | |
| 8,312,548 B1 | | 11/2012 | Cnudde et al. | |
| 8,631,492 B2 | | 1/2014 | Yablokov | |
| 8,966,634 B2 | | 2/2015 | Romanenko et al. | |
| 9,444,832 B1 | | 9/2016 | Ladikov et al. | |
| 9,614,867 B2 | | 4/2017 | Romanenko et al. | |
| 9,740,865 B2 | | 8/2017 | Levchenko | |
| 2004/0010679 A1 | * | 1/2004 | Moritz .................. | G06F 1/3203 713/1 |
| 2006/0161985 A1 | | 7/2006 | Zhao | |
| 2007/0130114 A1 | * | 6/2007 | Li ......................... | G06F 8/4442 |
| 2007/0156646 A1 | * | 7/2007 | Komatsu ............. | G06F 16/2438 |
| 2009/0044171 A1 | * | 2/2009 | Avadhanula ............ | G06F 8/34 717/105 |
| 2010/0010974 A1 | * | 1/2010 | Chieu ................... | G06F 9/5038 707/E17.005 |
| 2011/0145799 A1 | * | 6/2011 | Bartolomeo ........ | G06F 11/3604 717/132 |
| 2014/0298470 A1 | | 10/2014 | Yablokov et al. | |

(Continued)

OTHER PUBLICATIONS

Engblom, Jakob, and Andreas Ermedahl. "Modeling complex flows for worst-case execution time analysis." Proceedings 21st IEEE Real-Time Systems Symposium. IEEE, 2000. (Year: 2000).*

(Continued)

*Primary Examiner* — Syed A Zaidi

(74) *Attorney, Agent, or Firm* — Okamoto & Benedicto LLP

(57) ABSTRACT

The present disclosure provides an automated technique to detect and rectify input-dependent evasion code in a generic manner during runtime. Pattern-based detection is used to detect the evasion code and trigger an identification process. The identification process marks the evasion code and rectifies the execution flow to a more "significant" path. The execution then moves on by following this path to bypass the evasion code. Other embodiments, aspects and features are also disclosed.

17 Claims, 4 Drawing Sheets

(56) References Cited

U.S. PATENT DOCUMENTS

| | | | | |
|---|---|---|---|---|
| 2015/0067763 | A1* | 3/2015 | Dalcher | G06F 21/554 726/1 |
| 2015/0215335 | A1* | 7/2015 | Giuliani | H04L 63/1441 726/23 |
| 2016/0042182 | A1* | 2/2016 | Klein | G06F 21/566 726/9 |

OTHER PUBLICATIONS

Stappert, Friedhelm, Andreas Ermedahl, and Jakob Engblom. "Efficient longest executable path search for programs with complex flows and pipeline effects." Proceedings of the 2001 international conference on Compilers, architecture, and synthesis for embedded systems. ACM, 2001. (Year: 2001).*

Qin, Cheng-Zhi, and Lijun Zhan. "Parallelizing flow-accumulation calculations on graphics processing units—From iterative DEM preprocessing algorithm to recursive multiple-flow-direction algorithm." Computers & Geosciences 43 (2012): 7-16. (Year: 2012).*

Kessler, Claudius M., and John R. Anderson. "Learning flow of control: Recursive and iterative procedures." Human-Computer Interaction 2.2 (1986): 135-166. (Year: 1986).*

Yu, Hongtao, et al. "Level by level: making flow-and context-sensitive pointer analysis scalable for millions of lines of code." Proceedings of the 8th annual IEEE/ACM international symposium on Code generation and optimization. ACM, 2010. (Year: 2010).*

Oh, Nahmsuk, Philip P. Shirvani, and Edward J. McCluskey. "Control-flow checking by software signatures." IEEE transactions on Reliability 51.1 (2002): 111-122. (Year: 2002).*

Moser, Andreas, Christopher Kruegel, and Engin Kirda. "Exploring multiple execution paths for malware analysis." 2007 IEEE Symposium on Security and Privacy (SP'07). IEEE, 2007. (Year: 2007).*

Sharif, Monirul I., et al. "Impeding Malware Analysis Using Conditional Code Obfuscation." NDSS. 2008. (Year: 2008).*

* cited by examiner

```
.text:03501078
.text:03501078 loc_3501078:                              ; CODE XREF: start+50↑j
.text:03501078 mov     [ebp+var_8C], 0
.text:0350107F push    offset aGetsystemtime             ; "GetSystemTime"
.text:03501084 mov     eax, [ebp+var_8C]
.text:0350108A push    eax
.text:0350108B call    [ebp+var_28]
.text:0350108E mov     [ebp+var_8C], eax
.text:03501091 lea     ecx, [ebp+var_70]
.text:03501094 push    ecx
.text:03501095 call    [ebp+var_8C]                      ; call kernl32.GetSystemTime
.text:03501098 movzx   edx, [ebp+var_6E]
.text:0350109C cmp     edx, 9                            Check if current month is September via GetSystemTime API
.text:0350109F jz      short loc_35010AB
.text:035010A1 xor     eax, eax
.text:035010A3 jmp     loc_35020BC
.text:035010A8 ;
.text:035010A8
.text:035010A8 loc_35010A8:                              Perform malicious behaviors if current month is September
.text:035010A8 lea     eax, [ebp+var_18]
.text:035010AB push    eax
.text:035010AC mov     ecx, [ebp+var_5C]
.text:035010AF mov     edx, [ecx]
.text:035010B1 push    edx
.text:035010B2 mov     eax, [ebp+var_98]
.text:035010B8 push    eax
.text:035010B9 mov     ecx, [ebp+var_5C]
.text:035010BC mov     edx, [ecx]
.text:035010BE imul    edx, 8
.text:035010C1 push    edx
.text:035010C2 mov     eax, [ebp+var_38]
.text:035010C5 push    eax
.text:035010C6 push    2
.text:035010C8 call    [ebp+var_38]                      ; ntdll.RtlDecompressBuffer
.text:035010CB mov     ecx, [ebp+var_38]
.text:035010CE mov     [ebp+var_98], ecx                 Decompress data into buffer via RtlDecompressBuffer API
.text:035010D4 mov     edx, [ebp+var_98]
.text:035010DA movzx   eax, word ptr [edx]
.text:035010DD cmp     eax, 5A4Dh                        ; PE header "MZ"
.text:035010E2 jz      short loc_35010EE .text:035020BC
.text:035020BC loc_35020BC:                              ; CODE XREF: start+23↑j
.text:035020BC                                           ; start+2B↑j ...
.text:035020BC pop     esi
.text:035020BD mov     esp, ebp
.text:035020BF pop     ebp                               Program returns if current month is not September
.text:035020C0 retn    10h
```

FIG. 1

METHOD AND SYSTEM TO IDENTIFY AND RECTIFY INPUT DEPENDENCY BASED EVASION IN DYNAMIC ANALYSIS

BACKGROUND OF THE INVENTION

1. Field of the Invention

The present invention relates generally to computer security, and more particularly systems and methods for classifying unknown software downloads.

2. Description of the Background Art

Current technology in malware detection generally relies on the analysis of files to classify an executable as benign or malicious. Two complementary approaches are widely adopted in the industry: static and dynamic analysis. While both of them work well to a certain extent, suffer from common limitations.

SUMMARY

The present disclosure provides an automated technique to detect and rectify input-dependent evasion code in a generic manner during runtime. Pattern-based detection is used to detect the evasion code and trigger an identification process. The identification process marks the evasion code and rectifies the execution flow to a more "significant" path. The execution then moves on by following this path to bypass the evasion code.

A semantic pattern of input dependency is utilized on the first front to detect where the input data is introduced and what the input data looks like. The pattern-based detection models the data flow to identify the input data from external sources. This input data may be utilized to make a conditional judgement that changes the execution path. In other words, the pattern-based detection focuses on the data flow introduced from the input operations to the variables used in the conditional statements for branch selection.

These and other features of the present invention will be readily apparent to persons of ordinary skill in the art upon reading the entirety of this disclosure, which includes the accompanying drawings and claims.

BRIEF DESCRIPTION OF THE DRAWINGS

FIG. 1 shows an example code segment that uses an evasion technique.

DETAILED DESCRIPTION

Problems and Challenges

Figure 2:
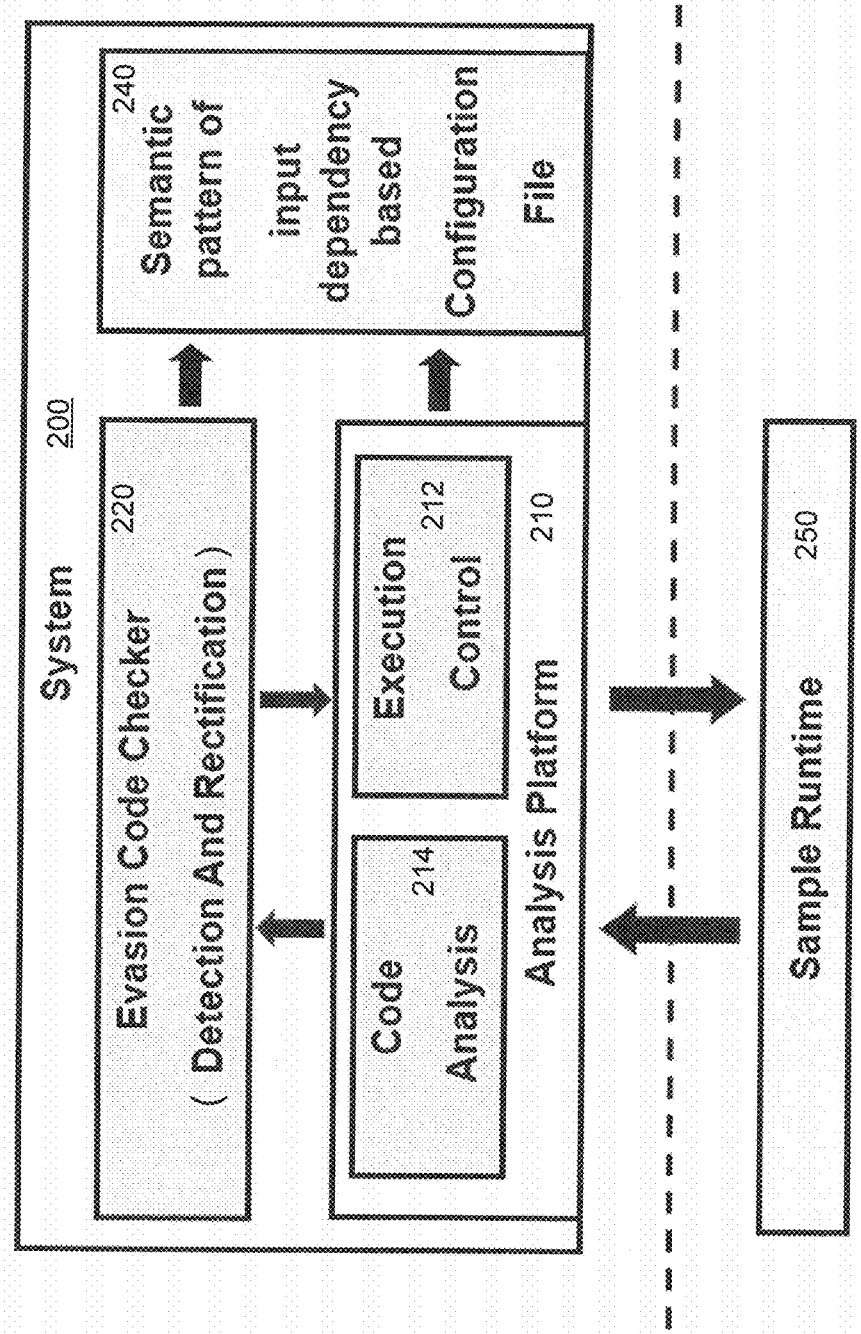
FIG. 2 shows a system for evasion code identification and rectification in accordance with an embodiment of the present invention.

Dynamic analysis plays an important role on malware detection. A dynamic analyzer launches a code sample to be analyzed in the configured environment and monitors for malicious behaviors during a period of runtime. A decision may then be made as to whether the code sample is malicious based on whether malicious behaviors were found in during the period of runtime.

A substantial drawback to dynamic analysis is that it generally monitors only on single execution path each time. However, the execution of the code sample on this single path may be made to be sensitive to the input data both from a user and the running environment. Hence, the code sample may change its behavior based on the input data so as to evade the dynamic analysis. In other words, the code sample may manipulate or vary its behavior based on the input data so that its malicious behavior does not occur when it is run in what appears to a protective "sandbox" environment, such as that used by a dynamic analyzer. Thus, the dynamic analyzer collects nearly no meaningful behaviors for such evasive code samples, and so the analysis fails.

One of the most frequently-used evasion techniques may be referred to as the semantic of input dependency or input-dependent evasion. This evasion technique has three essential key steps: (i) introducing the input data from the user environment or the system environment; (ii) checking whether a certain condition is satisfied or not via the input data; and (iii) judging whether or not to change or adapt the execution path based on the checking results. This evasion technique may be referred to as the semantic of input dependency because the introducing, checking and judging operations establishes the semantic connection from the input data to the evasion control flow of execution path. This semantic of input dependency is used frequently in evasion cases in the real world.

Sample Code Segment

FIG. 1 shows an example code segment that uses an evasion technique. This particular code segment performs a date check as the semantic of input dependency for an existing malware.

The malware code was obfuscated by encryption, and the figure shows the code after de-obfuscation. The code at 0x3501B95, which recites "call [ebp+var_4C]", calls the API of GetSystemTime to retrieve the current system date and time as the input data.

The date check is performed in the following instructions. The code at 0x3501698, which recites "movzx edx, [ebp+var_6E]", moves the current month data that stored in the stack based variable [ebp+var_6E], to the register of "edx". The edx is then compared to number 9 by the code at 0x3501B9C, which recites "cmp edx, 9". The number 9 corresponds to the month of September.

If the compare succeeds because the current month data is 9 (i.e. it is September), then the code at 0x3501B9F, which recites "jz short loc_3501BA8", causing the program to jump to the code at 0x3501BA8. The subsequent codes perform the malicious behaviors, including decompressing packed data in a buffer.

On the other hand, if the compare does not succeed because the current month is not 9 (i.e. it is not September), then the code at 0x3501BA3 causes the program to jump to the code at 0x35020BC. The subsequent codes causes the program to return to the calling routine without executing the malicious behaviors.

This example implementation of the evasion technique of the semantic of input dependency has worked to defeat the sandbox of a conventional dynamic analyzer. More and more malware codes are adopting the semantic of input dependency to perform evasion measures (such as retrieving and checking user or environment registry items, file contents and time configurations) against dynamic analysis systems.

It is very difficult and challenging to find an effective and generic way to counter this evasion technique because semantic of input dependency varies widely in different situations and samples. Hence, the process to identify the evasion technique has usually been handled manually on a case-by-case basis, which is exhausting and endless.

The difficulties of countering this evasion technique in a generic manner has many difficulties. First of all, there is the problem that modern programs introduce input data in many different ways. Any application program interface (API) or instructions that get input from users, or from the user or system environment, may introduce a source of data that may be utilized for evasive purposes. These varied sources are difficult to describe in a generic manner. Second, even if certain kinds of data are recognized as input, it is very challenging to create a generic process to figure out how the semantic of input dependency is interpreted and established. In other words, determining where, what and how the input data is introduced, checked and judged is quite hard to describe and analyze during the dynamic analysis, especially in an automatic way. These challenging aspects make it difficult for the analysis process to detect and identify the evasion code that applies the semantic of input dependency. Even if the evasion code is detected and identified, further steps are required to effectively counter and bypass it. For these reasons, few attempts have been made to formulate a generic solution.

Presently-Disclosed Solution

To solve the above-discussed problems and challenges, the present disclosure provides a generic way to describe and identify the evasion technique for the semantic of input dependency. Furthermore, runtime patches to rectify and bypass the evasion code are disclosed. Advantageously, the presently-disclosed solution enables dynamic analysis to persistently work against malware code, even when evasion code is used by the malware. This improves the applicability and accuracy of the dynamic analysis.

The present disclosure provides an automated technique to detect and rectify input-dependent evasion code in a generic manner during runtime. Pattern-based detection is used to detect the evasion code and trigger an identification process. The identification process marks the evasion code and rectifies the execution flow to a more "significant" path. The execution then moves on by following this path to bypass the evasion code.

The pattern-based detection models the data flow to identify the input data from external sources. This because this input data may be utilized to make a conditional judgement that changes the execution path. In other words, the pattern-based detection focuses on the data flow introduced from the input operations to the variables used in the conditional statements for branch selection.

A semantic pattern of input dependency is utilized on the first front to detect where the input data is introduced and what the input data looks like. In accordance with an embodiment of the invention, the semantic pattern is in the form of the two-element tuple of <Operation, Locations>.

The first element, Operation, may be either one of the API functions or an instruction which is used to take input in programs. This element indicates the external source which introduces the input data to the program. The external source may be in the users environment or the system environment.

The second element, Locations, comprises a series of memory locations, registers, variables or pointer names, combined with the size of each of them. This element indicates that the data in these specified locations were input from the external source via the corresponding operation.

System for Evasion Code Identification and Rectification

FIG. 2 shows a system 200 for evasion code identification and rectification in accordance with an embodiment of the present invention. The system 200 includes an analysis platform 210, an evasion code checker 220, and a semantic pattern of input dependency based configuration file 240.

The analysis platform 210 is a common analysis platform that is established to provide the basic functions for the higher-level modules (in particular, for the evasion code checker 220). Generally, the analysis platform 210 may be established on any program instruction inspection level. For example, the analysis platform 210 may be used at the level of a dynamic binary instrumentation tool, debuggers, interpreters, emulators, and even hypervisors. The analysis platform 210 includes an execution control module 212 and a code analysis module 214.

The execution control module 212 sets breakpoints in the image space of a sample binary code (sample runtime) 250. The breakpoints (checkpoints) are set to allow identification of evasion code. The execution control module 212 also allows the rectification process to be launched on demand. The context during runtime, including registers, stack and memory values, may be monitored, and also modified, if necessary, using the execution control module 212.

The code analysis module 214 covers the functions of the intermediate representation transformation (such as disassembling), and intra-function and inter-function analysis. Generally, the global relationship among all the sub-functions in the sample binary code is identified during an inter-function analysis phase, and the relationship in each single function is obtained by an intra-function analysis phase, once the control flow graph (CFG) has been built. Also, the code analysis module 214 may cover various inspect-able code representations, such as assemblies, high-level programming languages (including script languages), and so on.

The evasion code checker 220 lies above (i.e. utilizes the basic functions provided by) the analysis platform 210. The evasion code checker 220 is used to detect and rectify evasion code which is based on input dependency. In an exemplary implementation, the evasion code checker module 220 may access and utilize the semantic of input dependency based patterns that are predetermined and stored in the configuration file 240.

During operation, after the checkpoints are set, the system 200 generally works as follows. When the checkpoints are hit and triggered, an identification process may be launched by the system. The identification process attempts to locate the defined input data and performs an analysis when the defined input data affects the variables in a conditional judgement.

If the defined input data affects the variables in the conditional judgement, then a search process is launched from the conditional statement to find a "more significant" path between the true and false branches. Furthermore, once the more significant branch I found, then another new checkpoint may be set on the statement where the conditional variable is going to be evaluated. When the new checkpoint is hit, the system may take actions such that this more significant branch is the branch that is always taken. This prevents the malware code from successfully evading the dynamic analysis.

Method to Detect and Rectify Evasion Code

Figure 3:
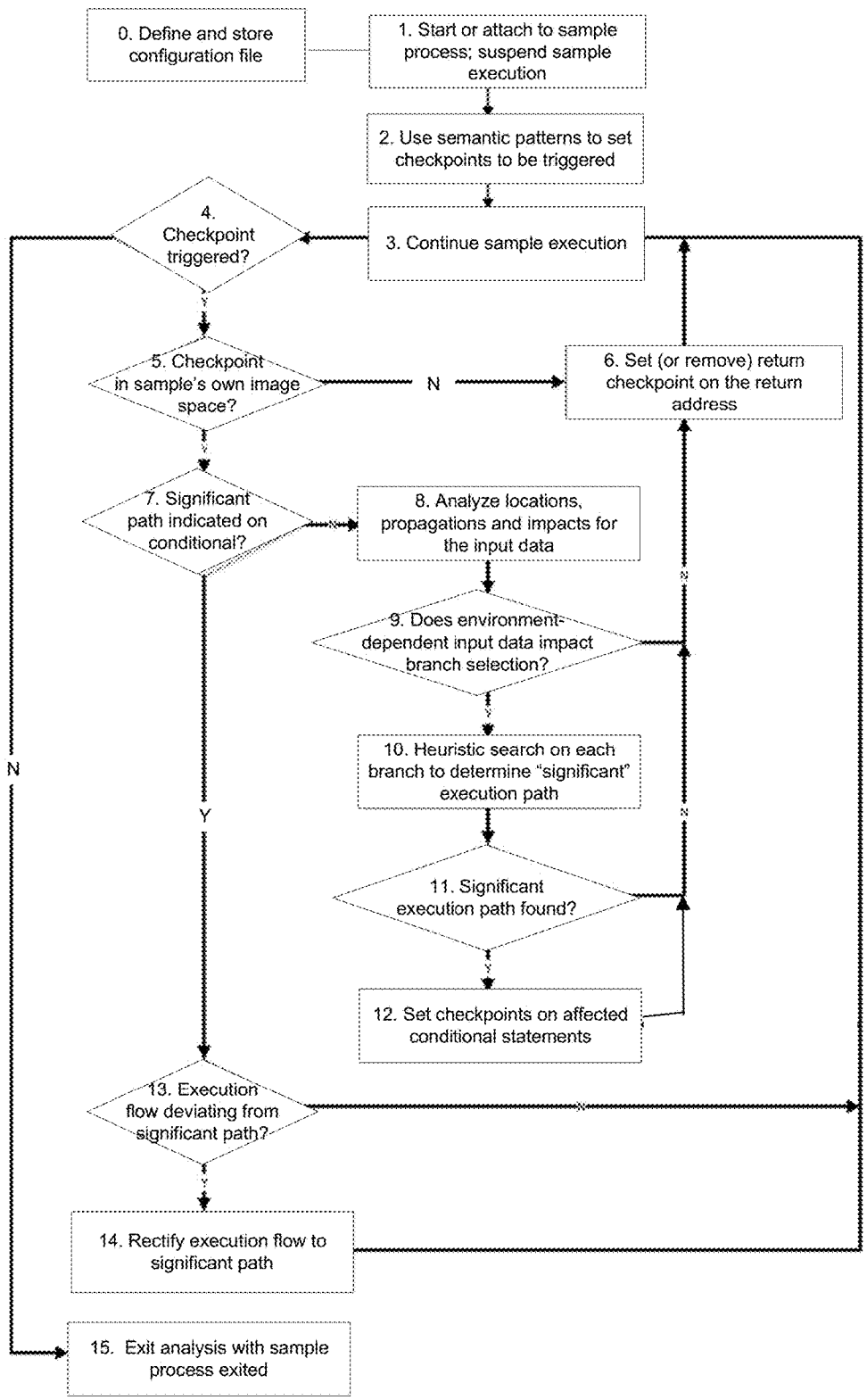
FIG. 3 shows a flow diagram of a computer-implemented method of detect and rectify evasion code in accordance with an embodiment of the present invention.

FIG. 3 shows a flow diagram of a computer-implemented method 300 to detect and rectify evasion code in accordance with an embodiment of the present invention. This method 300 may be performed by a dynamic analysis module of an anti-malware system, for example. In the exemplary implementation of the system 200 in FIG. 2, the method 300 (starting at step 1) may be performed by (i.e. under the control of) the evasion code checker 220 using the basic functions provided by the analysis platform 210.

In a preliminary step 0, a series of semantic patterns for input dependency is defined and stored in a configuration file 240. In an exemplary implementation, each semantic pattern of input dependency may be in the form of the above-described two-element tuple <Operation, Locations>, where the Operation indicates the operation (either API function or instruction) which introduces the input data (either in users environment or system environment) to the program, and the Locations indicate the storage locations of "environment-dependent" input data (i.e. the data input via an input operation from the users or system environment).

Per step 1, the system 200 starts the sample process (i.e. executes sample runtime code 250), or attaches onto an existing sample process (i.e. attaches onto sample runtime code 250 that is already executing) for the current round of analysis. The execution of sample process is suspended at the time when (i.e. immediately after) it is started or attached.

Per step 2, the system 200 sets checkpoints in the sample runtime code 250 according to the semantic patterns of input dependency in order to trigger the analysis process when the checkpoints are hit. The checkpoints may set on any API functions and instructions located both in sample its own image and external module space. (Note that checkpoints set in different manners are handled in different ways in the following steps.) Of particular interest in the following steps, a checkpoint may be set also on each conditional statement which may change the execution path depending on the evaluation of a value. Such checkpoints may be referred to as "conditional" checkpoints.

Per step 3, the sample process 250 is made to continue execution and monitoring. This execution and monitoring may be performed, for example, in a protected environment ("sandbox") by a dynamic analysis module of an anti-malware system.

Per step 4, the monitoring detects that a checkpoint is triggered. In an exemplary implementation, the checkpoint may be triggered in three cases: first, in an external API space; second, in the sample space but no significant path is involved; and, third, in the sample space and a significant path is involved. The statement for a checkpoint in the third case is usually a conditional statement; however, in the first and second cases, the checkpoint may be on any statement.

When a checkpoint is triggered in step 4, the execution of the sample process 250 is paused and suspended, and the method 300 goes to step 5. On the other hand, when no further checkpoints in the sample code remain to be triggered during execution of the sample, then the evasion code detection and rectification procedure is finished, so the method 300 may go to step 15.

Per step 5, the system determines whether the checkpoint that was triggered is in the image space of the sample process (an internal checkpoint) or in an external API function (an external checkpoint). If the checkpoint is not located in the image space of the sample process (i.e. the checkpoint is external), then the method 300 moves to step 6. Otherwise, if the checkpoint is located within the sample process's image space (i.e. the checkpoint is internal), then the method 300 moves to step 7.

Per step 6, the system 200 analyzes the runtime context of the external checkpoint to determine the address where the external API function was called, and sets a "return" checkpoint on the address to which the current API call returns. This checkpoint on the return address, when triggered, indicates to the system 200 that the execution has returned to the image space of the sample process. For example, in FIG. 1, the code at 0x03501B95 calls the GetSystemTime API, which is an external API function. In this example, the return checkpoint is set on the next instruction code at 0x03501B98, which is the address to which the GetSystemTime API returns. When triggered, the return checkpoint indicates to the system 200 that the execution has returned to the image space of the sample process. After setting the return checkpoint, the system 200 then loops back to step 3 and continues execution of the sample code.

On the other hand, per step 7, the internal checkpoint (which is within the image space of the sample process) may be analyzed to determine whether the checkpoint is on a conditional statement (is a "conditional" checkpoint) that was previously set in step 12 to indicate the "significant" branch or path.

If the checkpoint is not on a conditional statement with a significant-path indication, then the method 300 goes to step 8. On the other hand, if the checkpoint is on a conditional statement with a significant-path indication (as previously set in step 12), then the method 300 goes to step 13.

In step 8, as the checkpoint is not on a conditional statement which includes an indication as to which branch is significant, the system 200 analyzes locations, propagations and impacts of the environment-dependent input data. In order to figure out the changes and flows of the environment-dependent input data, the analysis may apply techniques including data flow analysis, taint analysis, and so on. The techniques applied may include both static and dynamic analysis. When a sub function is called during the flow, the method 300 may perform the above analysis recursively in an inter function manner. In consideration of performance, the analysis may be performed on code in limited regions, usually the nearby areas of the current checkpoint in the sample image space.

Per step 9, after the analysis of step 8, a determination is made as to whether the branch selection by the conditional statement depends on any environment-dependent input data. In other words, a determination is made as to whether any input data identified by the semantic patterns impacts or affects the variable expression in the conditional statement.

When step 9 determines that the variable expression in the conditional statement does not depend on any environment-dependent input data, then the conditional statement does not appear to have evasive purpose, so there is no need to set a conditional checkpoint for future analysis. As such, the method 300 may remove the current return checkpoint in step, and then loop back to step 3 to continue sample execution. On the other hand, iwhen step 9 determines that the variable in the conditional statement does depend on environment-dependent input data, then the conditional statement might have evasive purpose, so the method 300 moves forward to step 10.

Note that the method 300 operates iteratively and recursively by retrieving and setting the checkpoints on the caller addresses. When a sub-function is called by the sample code, the method 300 performs its analysis recursively in an inter-function manner. Meanwhile, if the sample code in the current level is found to not use the environment-dependent input data, then the method 300 goes up a level to the caller iteratively so as to continue the analysis again if the checkpoint is triggered in the future.

In steps 10 and 11, as the conditional statement is impacted by environment-dependent input data, the system 200 searches and analyzes each branch stemming from this conditional statement to find a significant execution path.

Per step 10, a heuristic search may be performed on each of the branches stemming from the conditional statement to find a "significant" execution path. In other words, the system 200 searches the true and false branches for the conditional statement at the checkpoint (and also, if applicable, true and false branches of each conditional statement subsequent to the conditional statement at the checkpoint) in a heuristic manner to find a significant execution path.

Generally speaking, a branch with more behaviors (API calls or instructions) and with substantial behaviors (creating processes or threads, connecting internet) is more likely to be found to be a significant execution path. On the contrary, a branch with fewer behaviors and with insubstantial behaviors (such as actions that are terminated immediately) is less likely to be found to be a significant execution path (and more likely to be "abandoned" as insignificant during the search). Also, in consideration of performance, the search process may be limited to a controlled area of code space.

Per step 11, a determination is made as to whether the heuristic search found a significant execution path. If a significant execution path was not found, then the conditional statement does not appear to have evasive purpose. Hence, in this case, the method 300 may remove current 'return' checkpoint in step 6 and loop back to step 3 to continue sample execution such that the execution continues past the conditional value evaluation statement. On the other hand, if a significant path was found, then the method 300 moves forward to step 12.

Per step 12, conditional statements where the input data was determined to be used for evasive purpose and from which the significant execution path stemmed may be marked with conditional checkpoints that indicate the branch to be verified and followed during execution. The marking of the significant execution path may be accomplished, for example, using a flag to indicate the branch to be followed. (In this case, the true value for the flag may be an indication to follow the true branch, and a false value for the flag may be an indication to follow the false branch, or vice versa.) After step 12, the method 300 may remove current return checkpoint in step 6 and loop back to step 3 where sample execution continues in another round such that the execution again triggers the conditional value evaluation statement in step 4. Note that a checkpoint set in step 12 is only used in steps 13 and 14.

Per step 13, as the conditional checkpoint (previously set in step 12) indicates which branch is a significant execution path, the system 200 may determine whether the current execution path is following that significant execution path. If the current execution path is following the significant execution path, then the method 300 may remove the current conditional checkpoint, loop back to step 3, and continue execution and monitoring of the sample code. On the other hand, if the current execution path is not following the significant execution path, then the method 300 may move forward to step 14.

Per step 14, the execution flow may be rectified. This means that the current execution path may be redirected (i.e. may jump) to the branch that follows the significant execution path. Thereafter, the method 300 may remove current conditional checkpoint, loop back to step 3 and continue execution of the sample code along the significant execution path When no further checkpoints remain to be triggered during the sample execution, then the method 300 may go to step 15. At step 15, since this sample may be running without any checkpoints triggered or exited, the evasion code detection and rectification procedure has been completed for this sample, and the system may exit or detach from the sample process.

Discussion of Method in Context of Sample Code

The following discusses the method 300 of FIG. 3 using a specific example based on the sample code in FIG. 1. For that sample code, a semantic pattern of input dependency may be as follows:

<
   Operation: "kernel32.dll_GetSystemTime",
   Locations: ["ARG1P:16" ]
>

The above example semantic pattern input dependency contains the Operation and Locations elements given above. The pattern information in this instance could be retrieved from the WINDOWS API specifications. The Operation that may introduce external input is GetSystemTime, exported by kernel32.dl. The Locations element (field) shows that the memory area pointed at by GetSystemTime's first argument with a size of 16 bytes as the input data. It is this memory area for the time structure that is passed to the API as the argument to receive the return values, and its "concrete" value (i.e. its actual value at that instance) would be retrieved during runtime. Multiple of such semantic patterns for input dependency may be defined and stored during step 0 in the configuration file 240.

In step 2, the API of GetSystemTime in kernel32.dl may be set as an initial checkpoint. Furthermore, in relation to this initial checkpoint, the system 200 enhances the analysis procedure recursively and iteratively by retrieving and setting the checkpoints on sub-functions and caller addresses. In step 6, a return checkpoint may be set at the return address of a call to GetSystemTime.

Subsequently, when the return checkpoint at the returned address 0x3501B98 of a call to GetSystemTime is triggered at step 4, a new round of analysis may be performed by the method 300. According to current concrete runtime context, the time structure that ranges from ebp-0x70 to ebp-0x60 in assemble code, is mapped to the the memory from 0x12FF50 to 0x12FF60. The new round of analysis may treat this area as the input data, and the retrieved input data of the current date may be marked as being externally derived.

As the return checkpoint is in the sample image space, and the significant path is not yet indicated, the method 300 flows to step 8. In step 8, the system 200 performs the data flow analysis to find the impact of the input data of the current date. The current month is identified from that input data and is used in the conditional variable evaluation statement at 0x03501B9F. Thus, in step 9, it is determined that the current date (which has been identified as environment-dependent input data) impacts the branch selection by the conditional variable evaluation statement at 0x03501B9F.

In step 10, the heuristic search process examines both the true and false branches of the conditional variable evaluation statement at 0x03501B9F to find a more significant path. In this case, the true branch starts at 0x03501B9F, and the false branch starts at 0x03501BA1. The heuristic search process finds that the false branch would transfer the execution flow to the end of the function with a direct jump instruction at 0x03501BA3, and that no significant operations is executed in this path. On the other hand, the heuristic search process finds that the true branch would transfer execution flow to 0x03501BA8, and that many significant operations are executed in this path.

In step 12, based on the heuristic search results, a new checkpoint is set on the conditional variable evaluation statement at 0x03501B9F to indicate that the true branch is the significant path. In other words, the execution flow should follow the true branch because the false branch appears to be for evasive purpose.

In the next round performed by the method 300, the checkpoint for 0x3501B9F is hit (triggered) again at step 4. Since the checkpoint for 0x03501B9F now indicates that the true branch is the significant path, the method 300 goes from step 7 to step 13 and, based on the current context, determines whether the execution flow is deviating from this significant path.

In the example code, the current month is held in the edx register. If the value of the edx register is not 9, then the actual (concrete) evaluation of the statement "jz 0x3501BAB" is false. As determined by step 13, this actual evaluation would lead the execution flow to deviate from the significant path. Hence, per step 14, the method 300 rectifies (changes) the execution flow to the true branch which is the significant path. This may be accomplished by the system 200 either inverting the ZF flag in the EFLAG register to alter the execution flow to the true branch starting at 0x3501BA8, or patching the code at 0x3501B9F with a direct jump instruction to 0x3501BA8. This circumvents the evasive code and exposes the malicious code to the dynamic analysis.

The above discussion of the method 300 relates to an example implementation where evasion code is identified and rectified in a WINDOWS x86/x64 platform. In this example implementation, the analysis platform is built on a debugger, and the code analysis function mainly focuses on x86/x64 assemblies. However, the presently-disclosed invention is, of course, not limited to this example implementation. More generally, the analysis platform may be built on a dynamic binary analysis (DBA) framework, and the code analysis may be extended to support codes of other computer architectures.

Note that, in the presently-disclosed solution, a limited amount of manual analysis of the input dependency may still be needed in certain instances. For example, some manual analysis may be used in a preliminary survey of all the API functions and instructions from a specification so as to summarize the semantic patterns of input dependency for a particular system. Alternatively, the analysis to summarize the semantic patterns of input dependency may be automated, for example, by parsing and summarizing the WINDOWS API specifications with automatic programs.

Example Computer System

Figure 4:
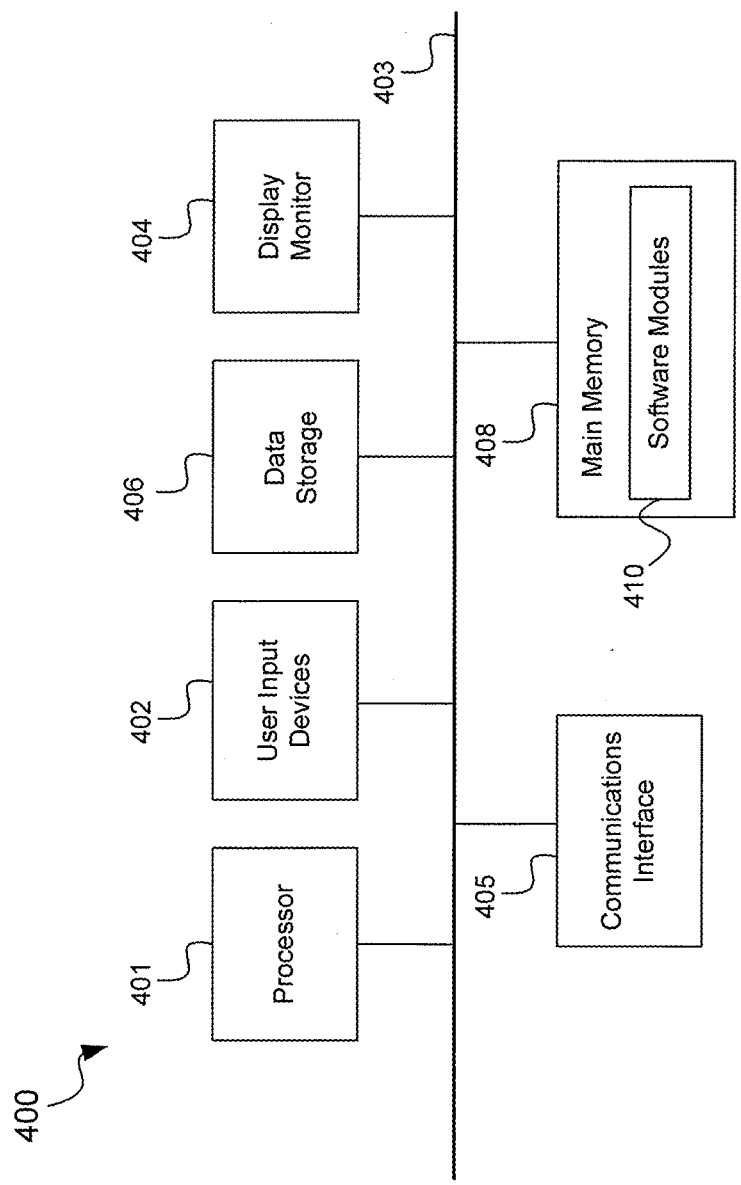
FIG. 4 is a schematic diagram showing, at a high-level, an example of a computer system that may be employed with embodiments of the present invention.

FIG. 4 is a schematic diagram showing, at a high-level, an example of a computer system 400 that may be employed with embodiments of the present invention. Other computer systems that may employ the presently-disclosed invention may have fewer or more components than those shown.

The computer system 400 may include one or more processors 401. The computer system 400 may have one or more buses 403 coupling its various components. The computer system 400 may include one or more user input devices 402 (e.g., keyboard, mouse), one or more data storage devices 406 (e.g., hard drive, optical disk, Universal Serial Bus memory), a display monitor 404 (e.g., liquid crystal display, flat panel monitor), a computer network interface 405 (e.g., network adapter, modem), and a main memory 408 (e.g., random access memory). The computer network interface 405 may be coupled to a computer network 409, which in this example includes the Internet.

The computer system 400 is a particular machine as programmed with one or more software modules 410, comprising instructions stored non-transitory in the main memory 408 for execution by the processor 401. An article of manufacture may be embodied as computer-readable storage medium including instructions that when executed by the processor 401 of the computer system 400 causes the computer system 400 to be operable to perform the functions of the one or more software modules 410. The software modules 410 may also comprise computer data, such as data structures.

In accordance with an embodiment of the present invention, the software modules 410 may include the above-discussed evasion code checker 220 that detects and rectifies evasion code. The software modules 410 may further include the above-discussed code analysis 214 and execution control module 212 of the analysis platform 210, and even the configuration file 240.

Conclusion

In general, an evasion technique may be implemented in different programming languages and may take various forms depending on the level of code implementation. Furthermore, the compilation, optimization, and code generation processes to build the executable transform the high-level code to low-level, which also change the representations of the evasion code. These different programming languages, different levels of code implementation, and changes in representation of the evasion code make identification of the evasion code much more difficult in both high and low level representations. This is because no general patterns are feasible to capture the various forms among different programming languages and different representations.

The present disclosure provides an effective solution to handle the input dependency based evasion code by using semantic patterns. The semantic patterns represent and describe the essence of the input dependency and may be used to effectively capture the sources, propagations and purposes of the evasion code.

The effectiveness of the semantic pattern of input dependency is rooted in the immutability of the semantic pattern across various code forms. The semantic pattern may be considered as originating when the malware programmer makes the decision to adapt an input for evasive purpose. The semantic pattern may be analyzed and extracted in various forms of code representations, under different programming languages, after compilation and optimization, and even after program mutation.

Once analyzed and extracted, the semantic pattern may be summarized and used broadly to counteract the evasive technique. This reduces the effort for manual analysis, improves the level of automation, and generalizes identification of the evasion.

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Systems and methods for protecting computers against remote malware downloads have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method to counteract evasive code, the method comprising:
   executing a code sample by a sample process under control of an analysis platform; and
   performing a recursive and iterative procedure to determine a significant path from a conditional value evaluation statement and avoid execution flow of the sample process from deviating from the significant path,
   wherein the recursive and iterative procedure comprises:
   triggering a checkpoint during the execution of the code sample;
   determining whether the checkpoint is in an image space of the sample process or an image space of an external procedure; and
   when the checkpoint is in the image space of the external procedure, setting a return checkpoint on a return address for the external procedure.

2. The computer-implemented method of claim 1 further comprising:
   determining whether environment-dependent input data impacts branch selection by the conditional value evaluation statement which follows the return checkpoint.

3. The computer-implemented method of claim 2 further comprising:
   when the environment-dependent input data does not impact the conditional value evaluation statement, continuing executing the code sample by the sample process under control of the analysis platform.

4. The computer-implemented method of claim 2 further comprising:
   when the environment-dependent input data impacts the conditional value evaluation statement, then performing a search to find the significant path, if any, on a branch of the conditional value evaluation statement.

5. The computer-implemented method of claim 4, further comprising:
   when the significant path is found on a branch, setting a conditional checkpoint indicating the significant path for the conditional value evaluation statement and continuing executing the code sample in another round such that the execution triggers the conditional checkpoint.

6. The computer-implemented method of claim 5, wherein the significant path is found when a substantial behavior is found on the branch, and wherein the substantial behavior includes at least creating processes or thread and connecting to the Internet.

7. The computer-implemented method of claim 5 further comprising:
   when the conditional checkpoint is triggered, determining whether execution flow of the sample process deviates from the significant path.

8. The computer-implemented method of claim 7 further comprising:
   when the execution flow of the sample process deviates from the significant path, rectifying the execution flow to follow the significant path.

9. A computer comprising a processor and a memory, the memory comprising instructions that when executed by the processor causes the computer to perform steps including:
   executing a code sample by a sample process under control of an analysis platform; and
   performing a recursive and iterative procedure to determine a significant path from a conditional value evaluation statement and avoid execution flow of the sample process from deviating from the significant path,
   wherein the recursive and iterative procedure comprises:
   triggering a checkpoint during the execution of the code sample;
   determining whether the checkpoint is in an image space of the sample process or an image space of an external procedure; and
   when the checkpoint is in the image space of the external procedure, setting a return checkpoint on a return address for the external procedure.

10. The computer of claim 9, wherein the recursive and iterative procedure further comprises:
    determining whether environment-dependent input data impacts branch selection by the conditional value evaluation statement which follows the return checkpoint.

11. The computer of claim 10, wherein the recursive and iterative procedure further comprises:
    when the environment-dependent input data does not impact the conditional value evaluation statement, continuing executing the code sample by the sample process under control of the analysis platform.

12. The computer of claim 10, wherein the recursive and iterative procedure further comprises:
    when the environment-dependent input data impacts the conditional value evaluation statement, then performing a search to find the significant path, if any, on a branch of the conditional value evaluation statement.

13. The computer of claim 12, wherein the recursive and iterative procedure further comprises:
    when the significant path is found on a branch, setting a conditional checkpoint indicating the significant path for the conditional value evaluation statement and continuing execution of the code sample in another round such that the execution triggers the conditional checkpoint.

14. The computer of claim 13, wherein the significant path is found when a substantial behavior is found on the branch, and wherein the substantial behavior includes at least creating processes or thread and connecting to the Internet.

15. The computer of claim 13, wherein the recursive and iterative procedure further comprises:
    when the conditional checkpoint is triggered, determining whether execution flow of the sample process deviates from the significant path.

16. The computer of claim 15, wherein the recursive and iterative procedure further comprises:
    when the execution flow of the sample process deviates from the significant path, rectifying the execution flow to follow the significant path.

17. A non-transitory computer-readable storage medium comprising instructions stored thereon, that when executed by a processor, perform steps comprising:
    executing a code sample by a sample process under control of an analysis platform; and
    performing a recursive and iterative procedure to determine a significant path from a conditional value evaluation statement and avoid execution flow of the sample process from deviating from the significant path,
    wherein the recursive and iterative procedure comprises:
    triggering a checkpoint during the execution of the code sample;

determining whether the checkpoint is in an image space of the sample process or an image space of an external procedure;

when the checkpoint is in the image space of the external procedure, setting a return checkpoint on a return address for the external procedure.

\* \* \* \* \*